(12) United States Patent
Ticknor (10) Patent No.: US 6,865,304 B1
(45) Date of Patent: Mar. 8, 2005

(54) LASER WRITTEN WAVEGUIDE POLARIZATION SWAPPER

(75) Inventor: Anthony J. Ticknor, Cupertino, CA (US)

(73) Assignee: Lightwave Microsystems Corporation, San Jose, CA (US)

( * ) Notice: Subject to any disclaimer, the term of this patent is extended or adjusted under 35 U.S.C. 154(b) by 0 days.

(21) Appl. No.: 10/003,885

(22) Filed: Oct. 25, 2001

(51) Int. Cl.[7] ............................. G02B 6/00; C03B 37/22
(52) U.S. Cl. ........................... 385/11; 385/37; 385/129; 65/386; 65/392
(58) Field of Search ............................. 385/11, 14, 31, 385/32, 37, 42, 45, 129, 130; 438/29, 31, 32; 65/385, 386, 392

(56) References Cited

U.S. PATENT DOCUMENTS

| | | | |
|---|---|---|---|
| 5,506,925 A | * | 4/1996 | Greene et al. ............... 385/129 |
| 5,546,483 A | | 8/1996 | Inoue et al. .................. 385/14 |
| 5,625,723 A | * | 4/1997 | Dragone et al. .............. 385/11 |
| 5,881,187 A | * | 3/1999 | Modavis ........................ 385/37 |
| 6,067,391 A | * | 5/2000 | Land ............................. 385/27 |
| 6,097,518 A | | 8/2000 | Wu et al. ..................... 359/128 |
| 6,115,514 A | | 9/2000 | Ando et al. ................... 385/11 |
| 6,166,838 A | | 12/2000 | Liu et al. ..................... 359/128 |
| 6,374,016 B2 | * | 4/2002 | Albert et al. ................. 385/37 |
| 6,404,542 B1 | * | 6/2002 | Ziari et al. ............... 359/341.3 |

OTHER PUBLICATIONS

Inoue, Y., et al. "Polarization Mode Converter With Polyimide Half Waveplate in Silica–Based Planar Lightwave Circuits," IEEE Photonics Technology Letters, vol. 6 No. 5, May 1994 pp 626–628.

* cited by examiner

*Primary Examiner*—Edward J. Glick
*Assistant Examiner*—Thomas Artman
(74) *Attorney, Agent, or Firm*—Amin & Turocy, LLP (57) ABSTRACT

Optical integrated circuits are disclosed in which a polarization swapping portion is formed in a portion of a waveguide using polarized light from a laser. Also disclosed are methods for fabricating optical integrated circuits and for mitigating polarization dependence in optical integrated circuits.

23 Claims, 6 Drawing Sheets

LASER WRITTEN WAVEGUIDE POLARIZATION SWAPPER

TECHNICAL FIELD

The present invention relates to the art of optical integrated circuits and more particularly to apparatus and methods for mitigating polarization dependence in optical integrated circuits.

BACKGROUND OF THE INVENTION

Optical integrated circuits (OICs) come in many forms such as 1×N optical splitters, optical switches, wavelength division multiplexers (WDMs), demultiplexers, optical add/drop multiplexers (OADMs), and the like. Such OICs are employed in constructing optical networks in which light signals are transmitted between optical devices for carrying data and other information. For instance, traditional signal exchanges within telecommunications networks and data communications networks using transmission of electrical signals via electrically conductive lines are being replaced with optical fibers and circuits through which optical (e.g., light) signals are transmitted. Such optical signals may carry data or other information through modulation techniques, for transmission of such information through an optical network. Optical circuits allow branching, coupling, switching, separating, multiplexing and demultiplexing of optical signals without intermediate transformation between optical and electrical media.

Such optical circuits include planar lightwave circuits (PLCs) having optical waveguides on flat substrates, which can be used for routing optical signals from one of a number of input optical fibers to any one of a number of output optical fibers or optical circuitry. PLCs make it possible to achieve higher densities, greater production volume and more diverse functions than are available with fiber components through employment of manufacturing techniques typically associated with the semiconductor industry. For instance, PLCs typically comprise optical paths known as waveguides formed on a silicon wafer substrate using lithographic processing, wherein the waveguides are made from transmissive media including lithium niobate ($LiNbO_3$) or other inorganic crystals, silica, glass, thermo-optic polymers, electro-optic polymers, and semiconductors such as indium phosphide (InP), which have a higher index of refraction than the chip substrate or the outlying cladding layers in order to guide light along the optical path. By using advanced photolithographic and other processes, PLCs are fashioned to integrate multiple components and functionalities into a single optical chip.

One important application of PLCs and OICs generally involves wavelength-division multiplexing (WDM) including dense wavelength-division multiplexing (DWDM). DWDM allows optical signals of different wavelengths, each carrying separate information, to be transmitted via a single optical channel or fiber in an optical network. For example, early systems provided four different wavelengths separated by 400 GHz, wherein each wavelength transferred data at 2.5 Gbits per second. Current multiplexed optical systems employ as many as 80 wavelengths, and systems are contemplated having more than 160 wavelength channels with 50 GHz spacing, carrying data at 10 Gbits per second in each channel.

Figure 1:
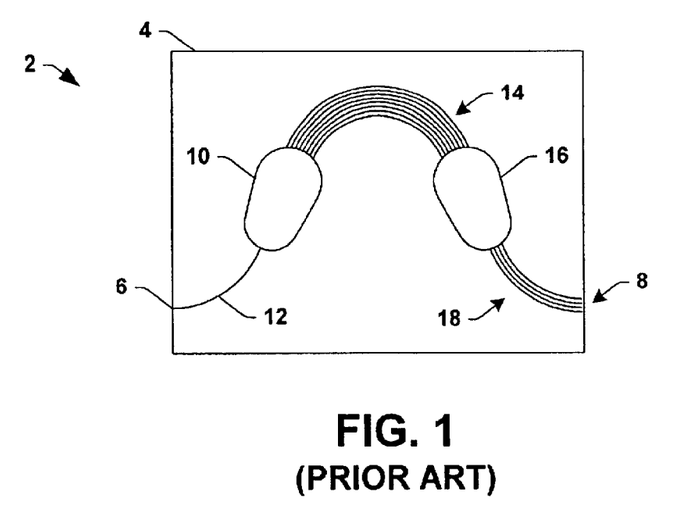
FIG. 1 is a schematic top plan view of a conventional arrayed-waveguide grating (AWG) multiplexer/demultiplexer device.

In order to provide advanced multiplexing and demultiplexing (e.g., DWDM) and other functions in such networks, arrayed-waveguide gratings (AWGs) have been developed in the form of PLCs. Existing AWGs can provide multiplexing or demultiplexing of as many as 80 channels or wavelengths spaced as closely as 50 GHz, and AWGs are contemplated to accommodate 128 wavelengths spaced at 25 GHz. As illustrated in FIG. 1, a conventional demultiplexing AWG 2 includes a base 4, such as a silicon substrate, with a single input port 6, and multiple output ports 8. Multiple wavelength light is received at the input port 6 (e.g., from an optical fiber in a network, not shown) and provided to an input lens 10 via an input optical path or waveguide 12 in the substrate base 4.

The input lens 10 spreads the multiple wavelength light into an array of waveguides 14, sometimes referred to as arrayed-waveguide grating arms. Each of the waveguides or arms 14 has a different optical path length from the input lens 10 to an output lens 16, resulting in a different phase tilt at the input to the lens 16 depending on wavelength. This phase tilt, in turn, affects how the light recombines in the output lens 16 through constructive interference. The lens 16 thus provides different wavelengths at the output ports 8 via individual output waveguides 18, whereby the AWG 2 can be employed in demultiplexing light signals entering the input port 6 into two or more demultiplexed signals at the output port 8. The AWG 2 can alternatively be used to multiplex light signals from the ports 8 into a multiplexed signal having two or more wavelength components at the port 6.

A problem with the AWG 2 of FIG. 1 is polarization dependence of the waveguides 14, caused by waveguide birefringence. Waveguide birefringence is experienced in varying degrees with waveguides fabricated from the above-mentioned materials. For example, where the waveguides 14 are formed by depositing a glass film on a silicon substrate, the difference in thermal expansion coefficient between the glass film and the silicon substrate base 4 causes stress applied on the waveguides 14 in a direction parallel to the surface to be different from that in a perpendicular direction. Waveguide birefringence results, wherein the refractive index of the waveguides 14 in the direction parallel to the substrate surface becomes different from that in the perpendicular direction. The birefringence, in turn, causes polarization dependence in the waveguides 14, where the optical path length difference (e.g., between adjacent waveguides 14) changes depending on the polarizing direction of light. In this situation, shifts occur between the transverse electric (TE) and transverse magnetic (TM) mode peaks, where the shift changes according to polarization. Consequently, the device characteristics change in accordance with the polarized state of the light provided to the device 2. For instance, the peak coupling in a particular channel or waveguide 14 can vary according to the polarities of the various wavelength components, causing polarization dependent wavelength (PDW) shift.

Figure 2:
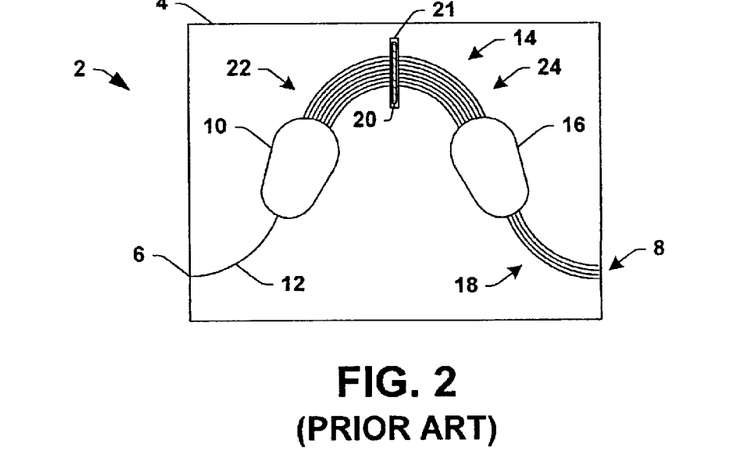
FIG. 2 is a schematic top plan view of the AWG device of FIG. 1, with a waveplate installed in a slot for reducing polarity dependent wavelength shift.
Figure 3:
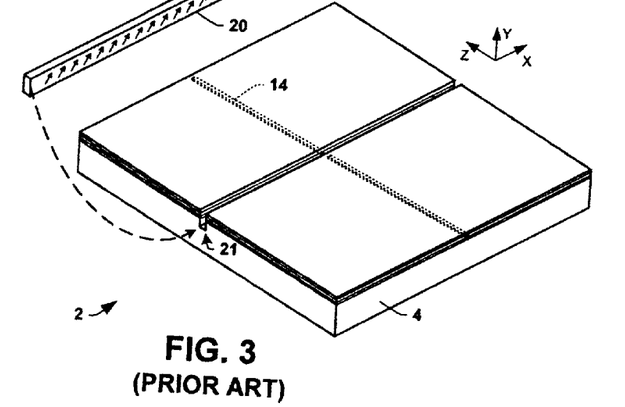
FIG. 3 is a perspective view of a portion of the AWG of FIGS. 1 and 2 with a slot intersecting a waveguide and a polarized waveplate for insertion into the slot.
Figure 4:
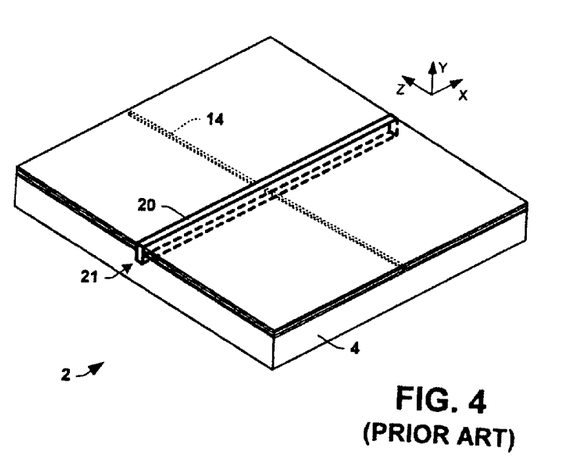
FIG. 4 is perspective view of the AWG of FIGS. 1–3 with the waveplate installed in the slot.

Referring to FIGS. 2–4, this polarization sensitivity or dependence in AWGs and other dispersive components has been heretofore addressed by bisecting the waveguides 14 and placing a polarization swapping device or waveplate, such as a half-waveplate 20, in a slot 21 between waveguide portions 22 and 24. The waveplate 20 is polarized at a 45 degree angle with respect to the X and Y axes, where the waveguide 14 intersects the slot 21 along the Z axis. Thus located, the waveplate 20 reduces or eliminates polarization dependence in the AWG 2. In particular, it has been found that the waveplate 20 causes polarization swapping partway along the optical paths of the bisected waveguides 14, such that any input polarization samples each propagation constant equally and provides essentially no shift in peak-wavelength with changes in input polarization. Thus, the spectrum for the TE and TM modes coincide through the use of the waveplate 20. Conventionally, the waveplate 20 is placed at the precise center of the grating arms or waveguides 14 to eliminate the wavelength shift resulting from birefringence.

Referring now to FIGS. 3 and 4, cutting the groove or slot 21 into the AWG 2 can cause reduced performance of the device, and complex assembly procedures are needed to properly install a polarization swapping waveplate 20 therein. Moreover, it is difficult to monitor and/or adjust or tune the polarization swapping performance of the installed waveplate 20 in the slot during manufacturing. Consequently, there remains a need for better solutions to polarity dependence in optical integrated circuits such as AWGs, which avoid or mitigate the performance reductions and complex assembly steps associated with the convention employment of waveplates in slots in such devices.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Rather, the sole purpose of this summary is to present some concepts of the invention in a simplified form as a prelude to the more detailed description that is presented hereinafter.

The present invention provides optical integrated circuits (OICs), in which a polarization swapping portion or waveplate is formed in a portion of a waveguide using polarized light, for example, from a laser. The invention further comprises methods for fabricating OICs and for mitigating polarization dependence in OICs. The invention may thus be employed to mitigate the polarization dependence in OICs such as arrayed waveguide gratings (AWGs), while avoiding or reducing the manufacturing difficulties associated with forming a slot and installing a separate waveplate into such devices. Moreover, the polarization swapping performance of the waveguide can be easily monitored and/or adjusted during formation.

According to one aspect of the present invention, an optical integrated circuit (OIC) is provided, which comprises a waveguide extending axially through a base along an optical path, with a polarization swapping portion formed in a portion of the waveguide using polarized light. The invention thus advantageously provides polarization swapping for mitigating polarization dependence in OICs such as AWGs, without the need to form a slot in the device and assemble a separate waveplate therein, as was previously done.

The polarization swapping portion of the waveguide can be polarized at an angle of about 42 degrees or more and about 48 degrees or less, for example, about 45 degrees with respect to axes perpendicular to the axis of the optical path by irradiating the polarization swapping portion with polarized light at an appropriate angle, so as to mitigate polarization dependence in the waveguide. The polarized light can be fempto-second pulsed visible light, ultra-violet (UV) light, or other light. The polarization swapping portion can be formed in the waveguide using polarized light from a laser or other source, and additionally, a prism may be employed in order to provide the polarized light at an appropriate angle with respect to the waveguide.

Another aspect of the invention provides a methodology for fabricating an optical integrated circuit. The method comprises providing a base, forming a waveguide extending axially through the base along an optical path, and forming a polarization swapping portion in a portion of the waveguide using polarized light. The polarization swapping portion may be formed by providing polarized light to the waveguide from a laser at an angle of about 45 degrees with respect to axes perpendicular to the axis of the optical path. The laser light may be provided to the waveguide through a prism in order to achieve the angle of about 45 degrees. The polarized light, moreover, can be one of femto-second pulsed visible light and UV light.

Yet another aspect of the invention provides a method of mitigating polarization dependence in an optical integrated circuit, such as a PLC AWG. The methodology comprises providing an optical integrated circuit having one or more waveguides extending axially through a base along an optical path, and forming a polarization swapping portion in a portion of the waveguides using polarized light. The formation of the polarization swapping portion can comprise providing polarized light to the waveguides at an angle of about 45 degrees with respect to axes perpendicular to the axis of the optical path, wherein the polarized light is femto-second pulsed visible light or UV light. The polarized light can be provided by a laser, and may be provided through a prism.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The various aspects of the present invention will now be described with reference to the drawings, wherein like reference numerals are used to refer to like elements throughout. The invention provides optical integrated circuits (OICs) having waveguides with a polarization swapping portions formed therein using polarized light, for example, from a laser. The invention further comprises methods for fabricating OICs and for mitigating polarization dependence in OICs. The invention may thus be employed in association with any type of OIC, such as arrayed waveguide gratings (AWGs), while avoiding or reducing the manufacturing difficulties associated with forming a slot and installing a separate waveplate into such devices. Moreover, the polarization swapping performance of the waveguide can be easily monitored and/or adjusted during formation.

Figure 5:
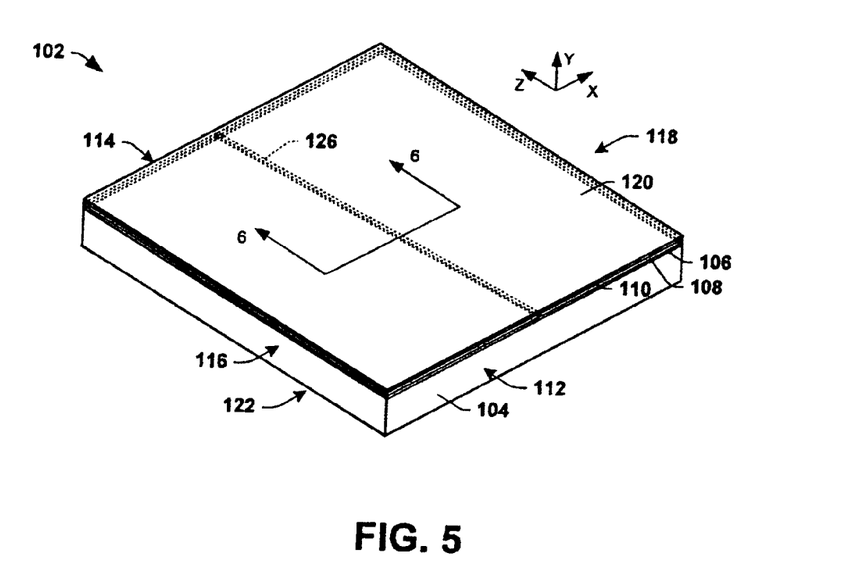
FIG. 5 is a perspective view of a portion of an exemplary planar lightwave circuit AWG having a waveguide therein, in which various aspects of the present invention may be implemented.
Figure 6:
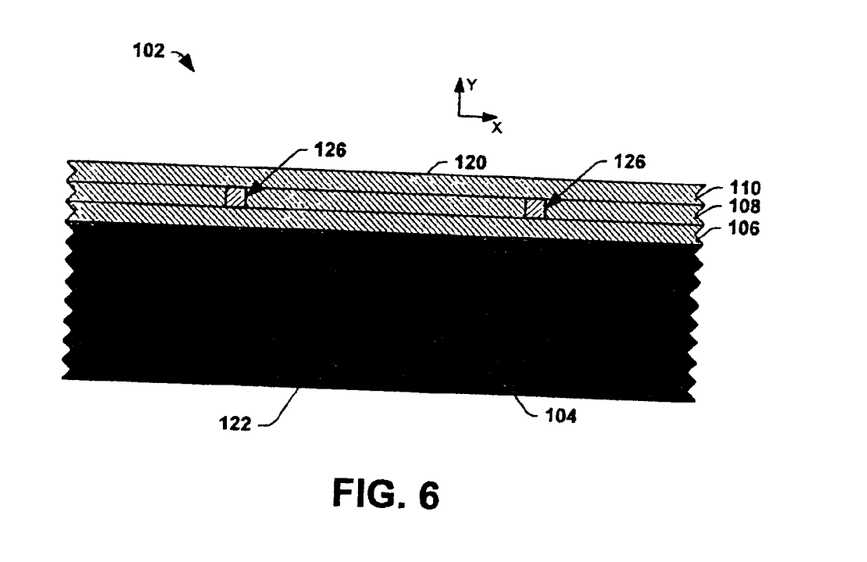
FIG. 6 is a partial sectional side view taken along line 6—6 of a the planar lightwave circuit of FIG. 5.
Figure 7:
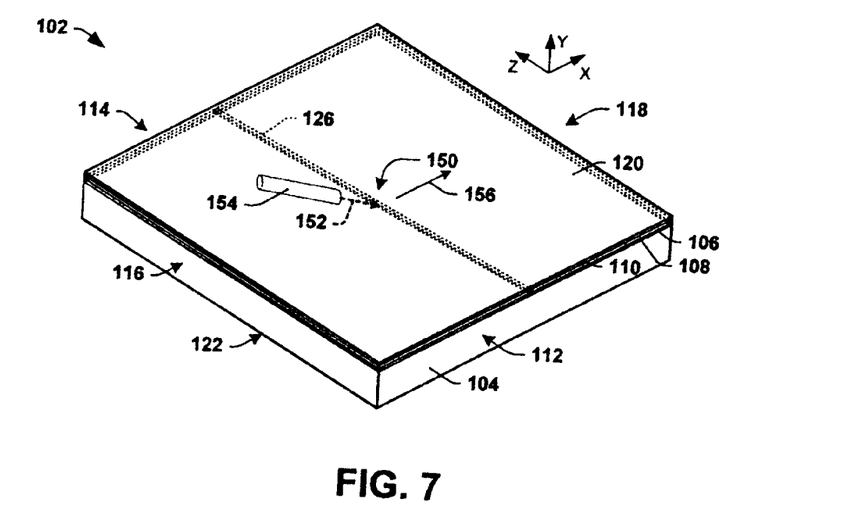
FIG. 7 is a perspective view of the planar lightwave circuit of FIGS. 5–6 with a polarity swapper formed in the waveguide using a laser in accordance with an aspect of the present invention.

One implementation of the invention is illustrated and described hereinafter with respect to a planar lightwave circuit (PLC) 102 of FIGS. 5–10. As illustrated in FIGS. 5 and 6, the PLC 102 comprises a base 104 extending longitudinally (e.g., along a Z axis) between front and rear ends 112 and 114, laterally (e.g., along an X axis) between first and second sides 116 and 118, and vertically (e.g., with respect to a Y axis) between a top 120 and a bottom 122. One or more waveguides 126 extend longitudinally through at least a portion of the base 104, and may be used to transmit light between optical components (e.g., lenses, or other optical devices, not shown) in the PLC 102. The waveguide 126 may be formed in an intermediate layer 108 between layers 106 and 110 formed in the base 104, for instance, wherein the base 104 is a substrate material such as silicon, and the layers 106, 108, and 110 (e.g., as well as the waveguide 126) are $SiO_2$, with the waveguide 126 having an index of refraction greater than that of the surrounding $SiO_2$.

Referring now to FIGS. 7–10, a portion 150 of the waveguide 126 is irradiated or written with polarized light 152 from a laser 154 along a lateral direction 156, where the polarized light 152 is directed through the waveguide 126 at an angle 158 of about 42 degrees or more and about 48 degrees or less with respect to the X and Y axes. In one implementation, the laser 154 may be oriented to provide the polarized light 152 at an appropriate angle 158 of about 45 degrees, and translated laterally with respect to the waveguide 126 in the direction 156 (e.g., in the positive and/or negative X direction), in order to laser write the portion 150, whereby the waveguide material is polarized in the portion 150. The laser may also be translated along the waveguide optical path (e.g., in the positive and/or negative Z direction) whereby the writing is performed on an appropriate longitudinal length (e.g., half-wavelength according to the birefringent difference for the light to be transferred in the waveguide 126) of the waveguide 126 in order to provide appropriate polarity swapping performance in the portion 150.

The waveguide 126 is shown as a straight line for simplicity. It is understood that the waveguide 126 may be curvilinear and extend between two optical components, such as lenses, positioned in the base 104. Also, it is understood that a plurality of waveguides 126 may be present on or within the base 104, as illustrated and described further hereinafter with respect to FIGS. 11 and 12.

According to another aspect of the invention, the laser light 152 can be ultraviolet (UV) light, or alternatively femto-second pulsed visible light from any appropriate source, including but not limited to the laser 154. While not wishing to be bound by any theory, it is believed that irradiation with light of a sufficiently short wavelength causes a change in the refractive index of the waveguide 126, resulting in a controllable adjustment in the phase relationship between the TE and TM peaks of light being transmitted through the waveguide 126. In this manner, polarization swapping can be achieved in the portion 150 in order to mitigate polarization dependent wavelength shift in the device 102. In this regard, it is believed that such irradiation causes annealing wherein localized heating of the waveguide material occurs, whereafter stress reduction results as the heated material cools. In addition, the irradiated light may cause creation of electronic holes in the waveguide molecules, thereby changing the index of refraction.

The irradiated light (e.g., UV or visible) is polarized, which affects molecules along the polarization axes to a greater degree that other molecules. As a result, the refractive index is changed of the molecules situated along the polarization axes is enhanced as compared to the molecules not so aligned, causing a controllable birefringence in the polarization swapping portion 150 of the waveguide 126. Thereafter, the transverse electric (TE) component of light in the waveguide 126 behaves differently that the transverse magnetic (TM) component, as compared with the relative behavior (e.g., peak phase relationship) in the non-irradiated portions of the waveguide 126. In this regard, the TE refractive index is changed by the irradiation to a greater degree that the TM refractive index.

The methods of the present invention may be employed to make waveplates (e.g., polarization swapping regions 150) precisely positioned within the waveguides 126, due to control over the change in refractive index, wherein this may be achieved through control of one or more parameters associated with the laser light (e.g., such as energy level, wavelength, angle of contact, etc.). As illustrated further in FIG. 12, any waveplate longitudinal length may be fabricated in the waveguide 126, including ½ wave plates, ¼ wave plates, ⅛ wave plates, and the like. Moreover, the waveplates 150 may be positioned anywhere within the waveguides 126.

With respect to the irradiated polarized light 152, UV irradiation can cause single photon effects in the waveguide 126, whereas visible light of sufficient energy density can cause multi-photon molecular interactions (e.g., up to three photons). Thus, visible (e.g., femto-second pulsed) light having multiple photon interactions can produce similar or better results than single photon UV interactions, even though the UV photons are of higher energy than individual visible light photons. In either case, single UV photon interactions, as well as multi-photon visible light interactions may be created via such irradiation to cause controllable refractive index changes in waveguide materials such as those recited above.

In one implementation of the invention, multiple-photon interaction via visible (e.g., femto-second pulsed) light is effective to make a dramatic difference between the TE and TM peaks. Visible light may be easier to polarize than UV light in a manufacturing setting. However, it will be appreciated that the present invention is not limited to UV and femto-second visible light irradiation, and that other types of polarized writing of waveguide portions fall within the scope of the invention. Any laser light that can induce a change in the refractive index of a waveguide may be employed.

Figure 8:
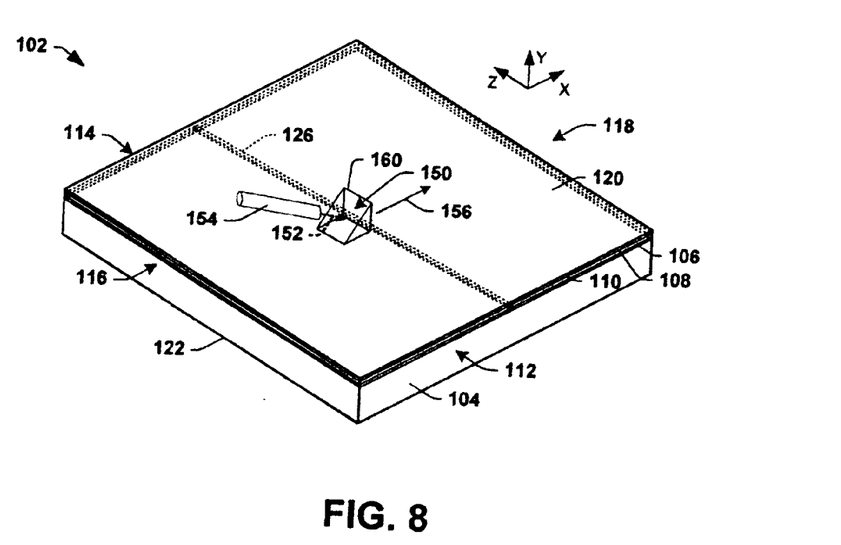
FIG. 8 is a perspective view of the planar lightwave circuit of FIGS. 5–7 with a polarity swapper formed in the waveguide using a laser and a prism in accordance with another aspect of the present invention.
Figure 9:
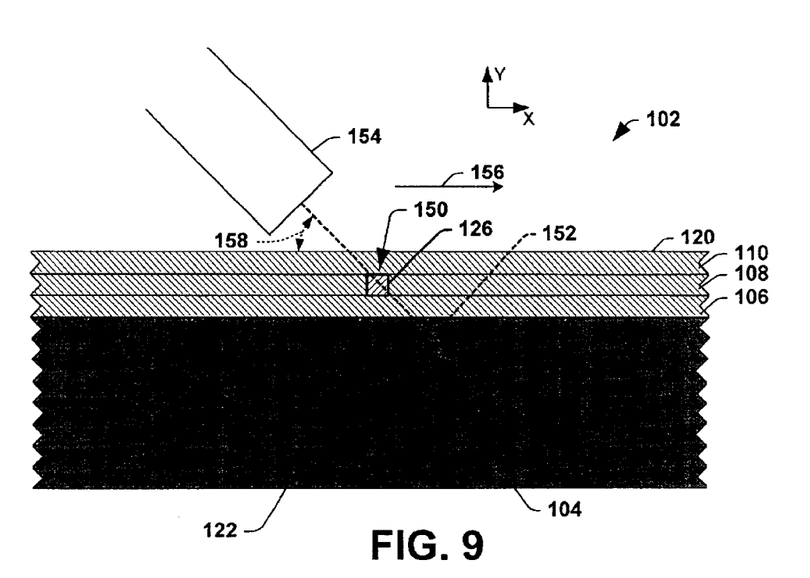
FIG. 9 is a partial sectional side view of a portion of the planar lightwave circuit of FIGS. 5–8.
Figure 10:
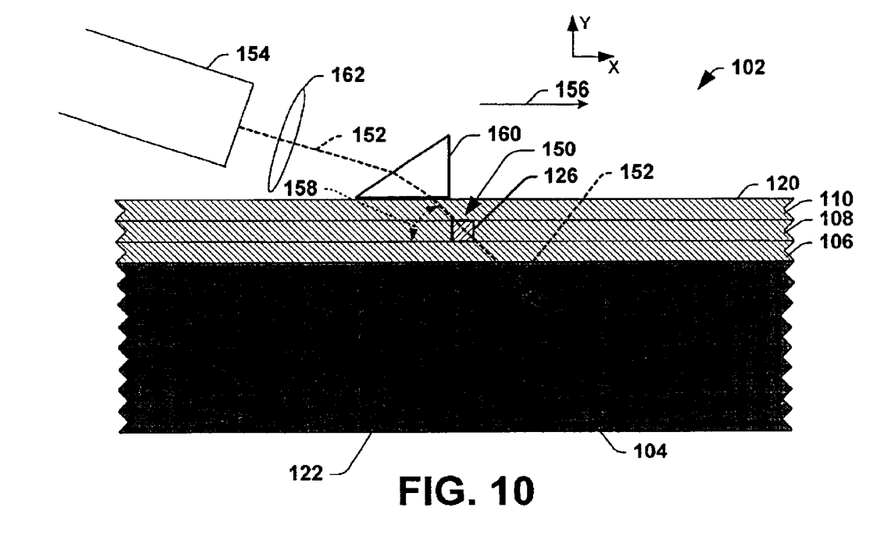
FIG. 10 is another partial sectional side view of a portion of the planar lightwave circuit of FIGS. 5–9.

As illustrated in FIGS. 8 and 10, polarized light 152 from the laser 154 may be provided to the waveguide 126 through a prism 160, in order to achieve the desired angle 158, as well as through a focusing device 162, such as a lens. The prism 160 can be employed wherein the light 152 from the laser 154 is redirected via the prism 160 so as to interact with the waveguide 126 at angle 158. It will be appreciated that any appropriate focusing and polarizing apparatus may be employed, whether integral with the laser 154 or separate therefrom, in order to provide polarized light to the portion 150 of the waveguide 126 in accordance with the invention. The portion 150 may be extended along the optical path of the waveguide 126 (e.g., in the Z direction) to any appropriate longitudinal length (e.g., such as a half-wavelength) in order to provide appropriate polarization swapping to mitigate polarization dependence in the device 102.

It will be noted that laser writing the portion 150 of the waveguide 126 provides significant advantages over prior polarization swapping techniques, such as those illustrated and described above with respect to FIGS. 1–4. For instance, the laser writing techniques of the invention eliminate the need for mechanically cutting a slot (e.g., slot 21 of FIGS. 2–4) in the optical circuit. This, in turn, mitigates performance degradation associated with such a slot, and eliminates a high precision machining step in the production of OICs. Also, no complex mechanical assembly of an external waveplate is needed in the PLC 102. Furthermore, the present invention provides a continuous integrated device, the performance of which can be dynamically monitored and tuned for improved accuracy, and which can be easily reworked by further laser writing. The writing of the polarization swapping portion 150 in the waveguide 126, moreover, can be performed at any number of points in the fabrication process, for instance, providing manufacturing flexibility. In this connection, the present invention provides an in situ method of making a waveplate in an optical integrated circuit.

Figure 11:
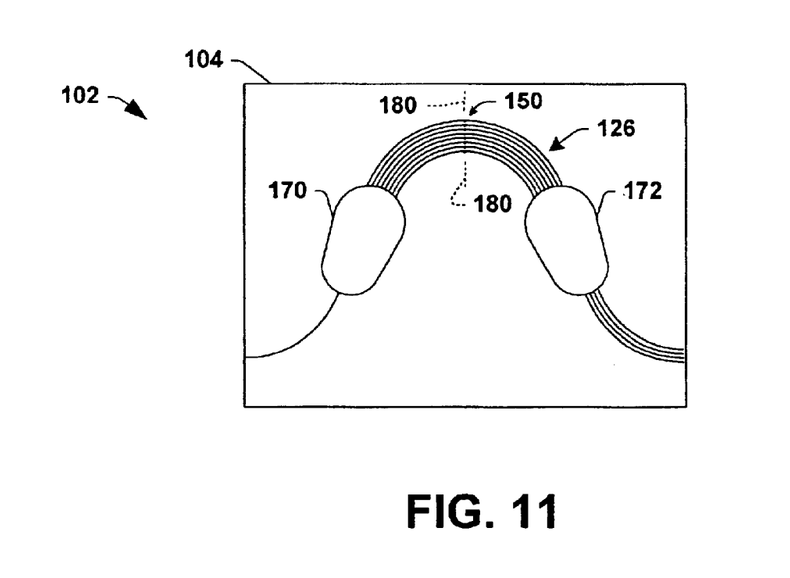
FIG. 11 is a schematic top plan view illustrating an arrayed-waveguide grating multiplexer/demultiplexer device having waveguides with polarization swapping portions or regions formed integrally therein in accordance with the present invention.
Figure 12:
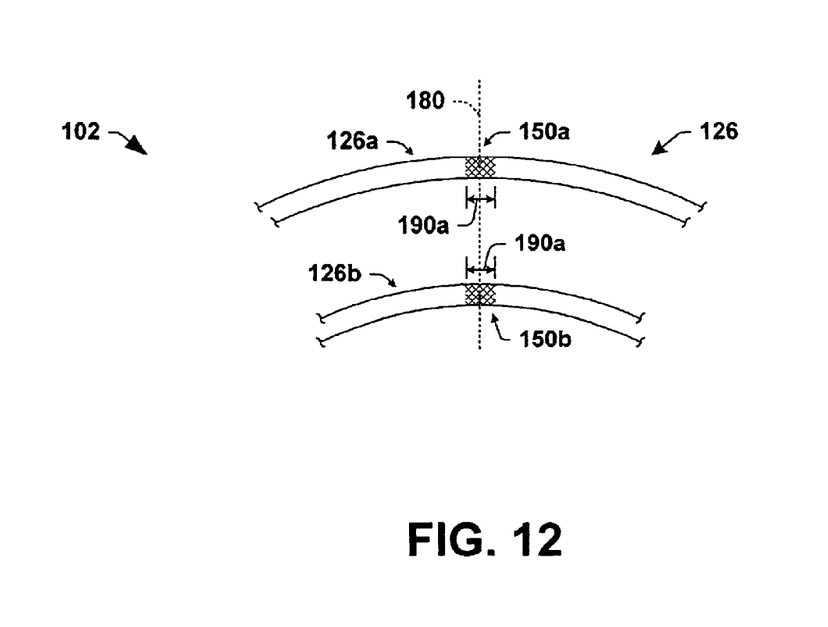
FIG. 12 is a schematic top plan view of a portion of the arrayed-waveguide grating device of FIG. 11, further illustrating the polarization swapping portions of two adjacent waveguides.

Referring also to FIGS. 11 and 12, the PLC 102 may comprise a multiplexing/demultiplexing arrayed-waveguide grating device having a plurality of waveguides 126 extending between first and second optical components 170 and 172, each having polarization swapping regions or portions 150 formed therein. The polarization swapping portions 150 are formed in adjacent waveguides 126 along a line 180, although the waveplate polarization swapping regions 150 can be located anywhere along the waveguides 126 within the scope of the invention. As illustrated in FIG. 12, polarization swapping portions 150a and 150b are formed into adjacent waveguides 126a and 126b, respectively, wherein the portions 150a and 150b are generally similar.

The portions 150a and 150b may be formed in the waveguides (e.g., using appropriate irradiated light, such as laser writing) so as to extend for any desired longitudinal length, such as lengths 190a and 190b, respectively. For instance, the portions 150 may extend for a fraction of the wavelength of light to be transferred through the waveguides 126, such as where lengths 190a and 190b are about one-half wavelength. The polarization swapping region lengths 190 can thus be chosen to provide for appropriate polarization swapping in the portions 150 as desired for a given optical integrated circuit design.

In another aspect of the invention, methods are provided for fabricating optical integrated circuits and for mitigating polarization dependence in optical integrated circuits. As an illustration, the exemplary OIC 102 can be fabricated by providing a base (e.g., base 104), forming at least one waveguide (e.g., waveguide 126) extending axially through the base along an optical path, and forming a polarization swapping portion (e.g., portion 150) in a portion of the waveguide using polarized light (e.g., light 152). Although the above method is described herein as a series of events and/or acts, the present invention is not limited by the described ordering of such acts. For instance, some acts or events can occur in different orders and/or concurrently with other acts or events, apart from the ordering described herein, in accordance with the invention. Moreover, not all events or acts may be required to implement a methodology in accordance with the present invention.

In addition, it will be appreciated that the methodologies according to the invention can be implemented in association with the apparatus and systems illustrated and described herein, as well as in association with other systems and apparatus not illustrated or described. Still another aspect of the invention provides methods of mitigating polarization dependence in an optical integrated circuit (e.g., OIC 102), comprising providing an optical integrated circuit having one or more waveguides (e.g., waveguide 126) extending axially through a base along an optical path, and forming a polarization swapping portion (e.g., portion 150) in a portion of the waveguides using polarized light.

Although the invention has been shown and described with respect to certain illustrated implementations, it will be appreciated that equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure, which performs the function in the herein illustrated exemplary aspects of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes", "including", "with", "has", "having", and variants thereof are used in either the detailed description or the claims, these terms are intended to be inclusive in a manner similar to the term "comprising."

What is claimed is:

1. A method of fabricating an optical integrated circuit, comprising:
   providing a base;
   forming at least one waveguide extending axially through at least a portion of the base along an optical path; and
   forming a polarization swapping portion in a portion of the at least one waveguide using polarized light, wherein the polarized light comprises at least one of femto-second pulsed visible light and UV light.

2. The method of claim 1, wherein forming the polarization swapping portion comprises providing polarized light to the at least one waveguide at an angle of about 45 degrees with respect to axes perpendicular to the axis of the optical path.

3. The method of claim 1, wherein the polarized light comprises femto-second pulsed UV light.

4. The method of claim 1, wherein forming the polarization swapping portion comprises providing polarized light to the at least one waveguide from a laser.

5. The method of claim 4, wherein forming the polarization swapping portion comprises providing polarized light to the at least one waveguide at an angle of about 45 degrees with respect to axes perpendicular to the axis of the optical path.

6. The method of claim 5, wherein the polarized light comprises femto-second pulsed UV light.

7. The method of claim 4, wherein the polarized light comprises femto-second pulsed visible light.

8. The method of claim 1, wherein forming the polarization portion comprises providing the polarized light from a laser to the at least one waveguide using a prism.

9. The method of claim 1, wherein the polarization swapping portion acts as one of a half-waveplate, a quarter-waveplate, and an eighth-waveplate.

10. A method of mitigating polarization dependence in an optical integrated circuit, comprising:

providing an optical integrated circuit having at least one waveguide extending axially through at least a portion of a base along an optical path; and forming a polarization swapping portion in a portion of the at least one waveguide using polarized light, wherein the polarized light comprises at least one of femto-second pulsed visible light and UV light.

11. The method of claim 10, wherein forming the polarization swapping portion comprises providing polarized light to the at least one waveguide at an angle of about 45 degrees with respect to axes perpendicular to the axis of the optical path.

12. The method of claim 10, wherein the polarized light comprises femto-second pulsed UV light.

13. The method of claim 10, wherein forming the polarization swapping portion comprises providing polarized light to the at least one waveguide from a laser.

14. The method of claim 13, wherein forming the polarization swapping portion comprises providing polarized light to the at least one waveguide at an angle of about 45 degrees with respect to axes perpendicular to the axis of the optical path.

15. The method of claim 14, wherein the polarized light comprises femto-second pulsed visible light.

16. The method of claim 13, wherein forming the polarization swapping portion comprises providing polarized light to the at least one waveguide at an angle of about 42 degrees or more and about 48 degrees or less with respect to axes perpendicular to the axis of the optical path.

17. The method of claim 10, wherein the polarization swapping portion acts as one of a half-waveplate, a quarter-waveplate, and an eighth-waveplate.

18. A method of fabricating an optical integrated circuit, comprising:

providing a base;

forming at least one waveguide extending axially through at least a portion of the base along an optical path; and forming a polarization swapping portion in a portion of the at least one waveguide using polarized light by providing the polarized light from a laser to the at least one waveguide using a prism, wherein the polarized light comprises at least one of femto-second pulsed visible light and UV light.

19. The method of claim 18, wherein forming the polarization swapping portion comprises providing polarized light to the at least one waveguide at an angle of about 42 degrees or more and about 48 degrees or less with respect to axes perpendicular to the axis of the optical path.

20. The method of claim 18, wherein forming the polarization swapping portion comprises providing polarized light to the at least one waveguide at an angle of about 45 degrees with respect to axes perpendicular to the axis of the optical path.

21. The method of claim 18, wherein forming the polarization swapping portion comprises providing polarized light to the at least one waveguide from a laser.

22. The method of claim 18, wherein the polarization swapping portion acts as one of a half-waveplate, a quarter-waveplate, and an eighth-waveplate.

23. The method of claim 18, wherein the polarized light comprises femto-second pulsed visible light.

* * * * *